(12) United States Patent
Park et al.

(10) Patent No.: US 11,754,501 B2
(45) Date of Patent: Sep. 12, 2023

(54) SURFACE-ENHANCED RAMAN SCATTERING SUBSTRATE BASED ON SURFACE PLASMON RESONANCE AND METHOD OF FABRICATING THE SAME

(71) Applicant: PICO FOUNDRY INC., Daejeon (KR)

(72) Inventors: Hyung Joon Park, Seoul (KR); Hee Jin Gil, Daejeon (KR); Si Jin Kim, Daejeon (KR); Yong Won Choi, Suwon-si (KR)

(73) Assignee: PICO FOUNDRY INC., Daejeon (KR)

( * ) Notice: Subject to any disclaimer, the term of this patent is extended or adjusted under 35 U.S.C. 154(b) by 0 days.

(21) Appl. No.: 17/581,231

(22) Filed: Jan. 21, 2022

(65) Prior Publication Data

US 2023/0213451 A1 Jul. 6, 2023

(30) Foreign Application Priority Data

Jan. 5, 2022 (KR) ........................ 10-2022-0001271

(51) Int. Cl.
*G01N 21/65* (2006.01)
*G02B 5/00* (2006.01)

(52) U.S. Cl.
CPC ........... *G01N 21/658* (2013.01); *G02B 5/008* (2013.01); *G01N 2201/06113* (2013.01)

(58) Field of Classification Search
None
See application file for complete search history.

(56) References Cited

U.S. PATENT DOCUMENTS

| | | | |
|---|---|---|---|
| 2006/0017918 A1* | 1/2006 | Cullum | G01N 21/658 356/301 |
| 2008/0093217 A1* | 4/2008 | Wu | G01N 21/658 204/450 |
| 2020/0271609 A1* | 8/2020 | Jung | H01L 29/413 |

FOREIGN PATENT DOCUMENTS

| | | |
|---|---|---|
| KR | 10-2169831 B1 | 10/2020 |
| TW | 200938928 A * | 9/2009 |

OTHER PUBLICATIONS

Mubeen, S., et al. "Plasmonic properties of gold nanoparticles separated from a gold mirror by an ultrathin oxide." Nano letters 12.4 (2012): 2088-2094 (Year: 2012).*

Haroon, Muhammad, et al. "Electrochemically modulated SERS detection of procaine using FTO electrodes modified with silver-decorated carbon nanosphere." Electrochimica Acta 387 (2021): 138463 (Year: 2021).*

* cited by examiner

*Primary Examiner* — Tarifur R Chowdhury
*Assistant Examiner* — Roberto Fabian, Jr.
(74) *Attorney, Agent, or Firm* — Sughrue Mion, PLLC

(57) ABSTRACT

The present invention relates to a surface-enhanced Raman scattering substrate and a method of fabricating the same. More particularly, the surface-enhanced Raman scattering substrate according to an embodiment includes a substrate; a lower plasmonic layer formed on the substrate and based on a first metal nanostructure; an oxide layer formed on the lower plasmonic layer; and an upper plasmonic layer formed on the oxide layer and based on a second metal nanostructure.

9 Claims, 9 Drawing Sheets

SURFACE-ENHANCED RAMAN SCATTERING SUBSTRATE BASED ON SURFACE PLASMON RESONANCE AND METHOD OF FABRICATING THE SAME

TECHNICAL FIELD

The present invention relates to a surface-enhanced Raman scattering substrate, and more particularly to a surface-enhanced Raman scattering substrate based on surface plasmon resonance and a method of fabricating the substrate.

BACKGROUND ART

Raman spectroscopy, which is an analytical technique applied to research into the vibrational structure of molecules or the qualitative/quantitative analysis of materials, can analyze the composition and structure information of a target material by analyzing the intensity of reflected light, when light emitted from an analyte is reflected, through a spectrum according to frequency.

Such Raman spectroscopy has attracted attention as a next-generation analysis technology because it enables fast, accurate, and non-destructive analysis. However, existing Raman spectroscopy has a problem in that it is difficult to analyze a trace amount of analyte due to the low Raman scattering probability of molecules and the possibility of generating strong fluorescence.

Accordingly, a method using the surface-enhanced Raman scattering (SERS) effect has been proposed to solve the problem of low signal intensity.

Surface-enhanced Raman scattering can significantly increase the intensity of the Raman spectrum by energy absorbed into a surface. Here, an enhancement factor (EF) used as a measure of the surface-enhanced Raman scattering scale is usually $10^4$ to $10^8$. Since such an EF is determined by the material and nanostructure pattern of a substrate surface, fabrication of high-sensitivity active substrates is emerging as a key task of the surface-enhanced Raman scattering analysis technology.

That is, research into optimizing the material and nanostructure pattern of a surface-enhanced Raman scattering substrate surface is underway so as to improve the analysis performance of the substrate, but such research into optimizing a surface material and a nanostructure pattern has a limitation in optimizing the analysis performance of a surface-enhanced Raman scattering substrate.

RELATED ART DOCUMENT

Patent Document

Korean Patent No. 10-2169831, "A SUBSTRATE FOR SURFACE ENHANCED RAMAN SCATTERING AND FABRICATING METHOD OF THE SAME"

DISCLOSURE

Technical Problem

Therefore, the present invention has been made in view of the above problems, and it is one object of the present invention to provide a high-performance surface-enhanced Raman scattering substrate having high signal enhancement effect and excellent signal uniformity and reproducibility; and a method of fabricating the high-performance surface-enhanced Raman scattering substrate.

It is another object of the present invention to provide a high-performance surface-enhanced Raman scattering substrate fabricated by inserting an oxide layer between a plurality of metal nanostructures; and a method of fabricating the high-performance surface-enhanced Raman scattering substrate, thereby being capable of maximizing the surface plasmon resonance coupling effect and, accordingly, being capable of securing a Raman signal enhanced to a higher level.

It is yet another object of the present invention to provide a high-performance surface-enhanced Raman scattering substrate capable of separating an analyte by the molecular weight and polarity thereof to acquire a Raman signal; and a method of fabricating the high-performance surface-enhanced Raman scattering substrate, thereby being capable of more easily analyzing the analyte.

Technical Solution

In accordance with an aspect of the present invention, the above and other objects can be accomplished by the provision of a surface-enhanced Raman scattering substrate, including: a substrate; a lower plasmonic layer formed on the substrate and based on a first metal nanostructure; an oxide layer formed on the lower plasmonic layer; and an upper plasmonic layer formed on the oxide layer and based on a second metal nanostructure.

According to an aspect, the oxide layer may be formed in a region wherein hotspots based on electromagnetic field generated between the lower plasmonic layer and the upper plasmonic layer overlap, so that surface plasmon resonance generated through the lower plasmonic layer and the upper plasmonic layer overlaps.

According to an aspect, the oxide layer may be formed on the lower plasmonic layer and is based on an oxide nanostructure.

According to an aspect, at least one of the first metal nanostructure, the second metal nanostructure and the oxide nanostructure may be a structure based on at least one of a plurality of nanowires, a plurality of nanoparticles, a plurality of nanorods and a nanowire array wherein a plurality of nanowires vertically intersect each other.

According to an aspect, the oxide layer may be formed to a thickness of 5% to 30% of a thickness of at least one of the lower plasmonic layer and the upper plasmonic layer.

According to an aspect, the oxide layer may be formed to a thickness of 1 nm to 6 nm.

According to an aspect, at least one of the first metal nanostructure and the second metal nanostructure may be a nanostructure based on at least one metal material of gold (Au), silver (Ag), and platinum (Pt).

According to an aspect, the oxide layer may be inserted by capillary action of an analyte applied on the upper plasmonic layer.

According to an aspect, the substrate may include a plurality of electrodes formed in at least two regions among a plurality of edge regions and, when a voltage having a preset magnitude is applied to the plurality of electrodes, the analyte may be separated based on at least one of molecular weights and polarity.

In accordance with another aspect of the present invention, there is provided a method of fabricating a surface-enhanced Raman scattering substrate, the method including: forming a substrate; forming a first metal nanostructure-based lower plasmonic layer on the substrate; forming an oxide layer on the lower plasmonic layer; and forming a second metal nanostructure-based upper plasmonic layer on the oxide layer.

Advantageous Effects

As apparent from the above description, the present invention can provide a high-performance surface-enhanced Raman scattering substrate having high signal enhancement effect and excellent signal uniformity and reproducibility.

According to an embodiment, the present invention can maximize the surface plasmon resonance coupling effect by inserting an oxide layer between a plurality of metal nanostructures, thereby being capable of securing a Raman signal enhanced to a higher level.

According to an embodiment, the present invention can separate an analyte by the molecular weight and polarity thereof to acquire a Raman signal, thereby being capable of more easily analyzing the analyte.

BEST MODE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

Figure 1:
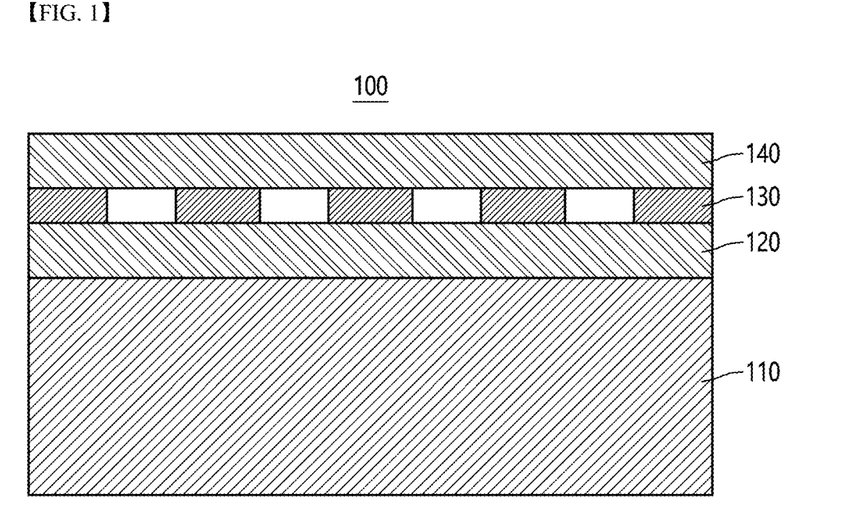
FIG. 1 illustrates a surface-enhanced Raman scattering substrate according to an embodiment.

FIG. 1 illustrates a surface-enhanced Raman scattering substrate according to an embodiment.

Referring to FIG. 1, a surface-enhanced Raman scattering substrate 100 according to an embodiment may be a high-performance substrate having high signal enhancement effect and excellent signal uniformity and reproducibility.

In addition, the surface-enhanced Raman scattering substrate 100 can maximize the surface plasmon resonance coupling effect by inserting an oxide layer between a plurality of metal nanostructures, thereby being capable of securing a Raman signal enhanced to a higher level.

In addition, the surface-enhanced Raman scattering substrate 100 can separate an analyte by the molecular weight and polarity thereof to acquire a Raman signal, thereby being capable of more easily analyzing the analyte.

Particularly, the surface-enhanced Raman scattering substrate 100 may include a substrate 110, a lower plasmonic layer 120 formed on the substrate 110, an oxide layer 130 formed on the lower plasmonic layer 120 and an upper plasmonic layer 140 formed on the oxide layer 130.

Here, the lower plasmonic layer 120 may be formed based on a first metal nanostructure, the upper plasmonic layer 140 may be formed based on a second metal nanostructure, and the first and second metal nanostructures may generate surface plasmon resonance. In addition, the oxide layer may be formed on an oxide nanostructure.

For example, the substrate 110 may be formed of, but not limited to, at least one of a polymer film, glass, and a ceramic material.

According to an aspect, the substrate 110 may be coated with any one of gold (Au), silver (Ag), copper (Cu), nickel (Ni), platinum (Pt), chromium (Cr), cobalt (Co) and palladium (Pd).

According to an aspect, at least one of the first metal nanostructure, the second metal nanostructure and the oxide nanostructure may be a structure based on at least one of a plurality of nanowires, a plurality of nanoparticles, a plurality of nanorods, and a nanowire array wherein a plurality of nanowires vertically intersect each other.

According to an aspect, the nanowire array may include a multi-stack metal nanowire array on which a single-layered metal nanowire array, stacked on a polymer mold to which the pattern of a master mold is replicated, is transferred and alternately and repeatedly formed to be perpendicular to each other.

For example, the polymer mold may be made of PMMA, and metal nanowires constituting the nanowire array may have a diameter of 25 nm to 50 nm.

In addition, the lower plasmonic layer 120 and the upper plasmonic layer 140 may be formed by stacking the nanowire array 4 to 10 times.

According to an aspect, at least one of the first metal nanostructure and the second metal nanostructure may be, but not limited to, a nanostructure based on at least one metal material of gold (Au), silver (Ag), and platinum (Pt), and the oxide nanostructure may be, but not limited to, a nanostructure based on silicon oxide ($SiO_2$).

According to an aspect, the oxide layer 130 is formed in a region wherein hotspots based on electromagnetic field generated between the lower plasmonic layer 120 and the upper plasmonic layer 140 overlap, so that surface plasmon resonance generated through the lower plasmonic layer and the upper plasmonic layer may overlap.

For example, hotspots may mean locations, where a stronger electromagnetic field is generated, between a plurality of metal nanostructures spaced apart by a narrow interval In other words, the oxide layer 130 is inserted into an empty space between the lower plasmonic layer 120 and the upper plasmonic layer 140, thereby being capable of optimally maintaining an interval between the lower plasmonic layer 120 and the upper plasmonic layer 140 and maximizing surface plasmon resonance coupling effect due to the lower plasmonic layer 120 and the upper plasmonic layer 140. Accordingly, a Raman signal enhanced to a higher level can be secured.

According to an aspect, the oxide layer 130 may be formed to a thickness of 5% to 30% of the thickness of at least one of the lower plasmonic layer 120 and the upper plasmonic layer 140. For example, the oxide layer 130 may be formed to a thickness of 1 nm to 6 nm.

Preferably, the lower plasmonic layer 120 and the upper plasmonic layer 140 may be formed to a thickness of 20 nm, and the oxide layer 130 may be formed to a thickness of 4 nm to 5 nm that is 20% to 25% of the thickness of the lower plasmonic layer 120 and the upper plasmonic layer 140.

Meanwhile, an analyte may be applied onto the upper plasmonic layer 140. After application of the analyte, laser irradiated through an external device can detect the analyte using light scattered by the analyte, i.e., using a Raman signal through surface-enhanced Raman scattering measurement.

According to an aspect, an analyte applied on the upper plasmonic layer 140 may be inserted by capillary action into the oxide layer 130.

Particularly, an analyte should penetrate well into a space between the lower plasmonic layer 120 and the upper plasmonic layer 140 so as to maximize the coupling effect of surface plasmon resonance and, for this, the lower plasmonic layer 120, oxide layer 130 and upper plasmonic layer 140 of the surface-enhanced Raman scattering substrate 100 may be implemented as a nanostructure.

In other words, due to the nanostructure-based structural feature of the surface-enhanced Raman scattering substrate 100, an analyte may be smoothly inserted into a space, i.e., the oxide layer 130, between the lower plasmonic layer 120 and the upper plasmonic layer 140.

According to an aspect, the substrate 110 may include a plurality of electrodes formed in at least two regions among a plurality of edge regions and, when a voltage having a preset magnitude is applied to the plural electrodes, an analyte may be separated based on at least one of molecular weights and polarity.

Figure 2:
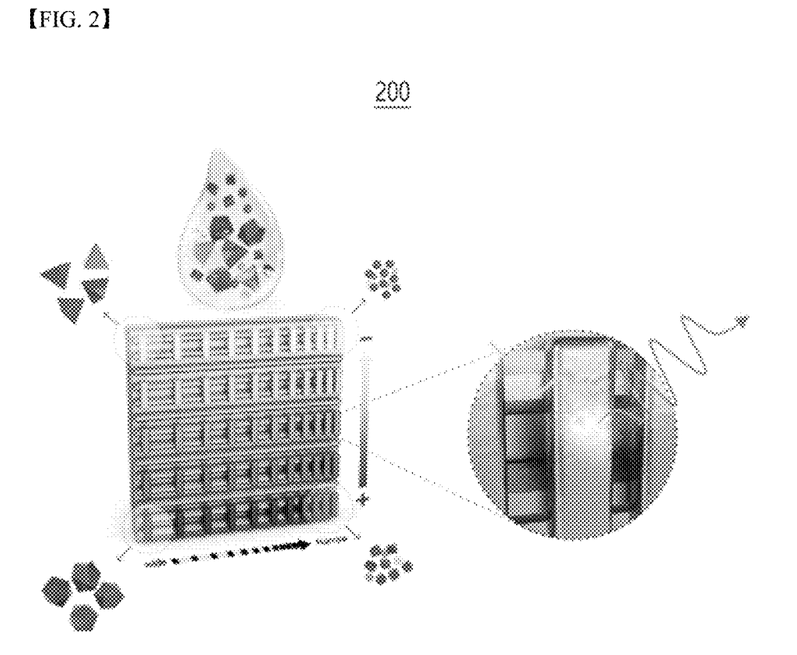
FIG. 2 is a view for explaining an example of analyzing a material using a surface-enhanced Raman scattering substrate according to an embodiment.

FIG. 2 is a view for explaining an example of analyzing a material using a surface-enhanced Raman scattering substrate according to an embodiment.

Referring to FIG. 2, reference numeral 200 illustrates an example of applying voltage to the surface-enhanced Raman scattering substrate according to an embodiment to separate an analyte.

According to reference numeral 200, the surface-enhanced Raman scattering substrate according to an embodiment is formed by stacking a substrate, a lower plasmonic layer, an oxide layer and an upper plasmonic layer. Here, the substrate may include a plurality of electrodes formed in at least two regions among a plurality of edge regions.

For example, first to fourth electrodes may be respectively disposed in first to fourth regions corresponding to four corners of the substrate.

According to an aspect, when a voltage having a preset magnitude is applied to at least two electrodes among the first to fourth electrodes included in the substrate, through an external voltage application means, an analyte inserted into the oxide layer may be separated based on at least one of the intrinsic molecular weight and polarity of the analyte, and the surface-enhanced Raman scattering substrate may acquire Raman signals respectively corresponding to the separated analytes.

In other words, the surface-enhanced Raman scattering substrate may acquire a plurality of Raman signals, divided according to the molecular weight and polarity of the analyte, based on the voltage applied to the electrodes, and accordingly, can more easily and accurately analyze the analyte.

Figure 3A:
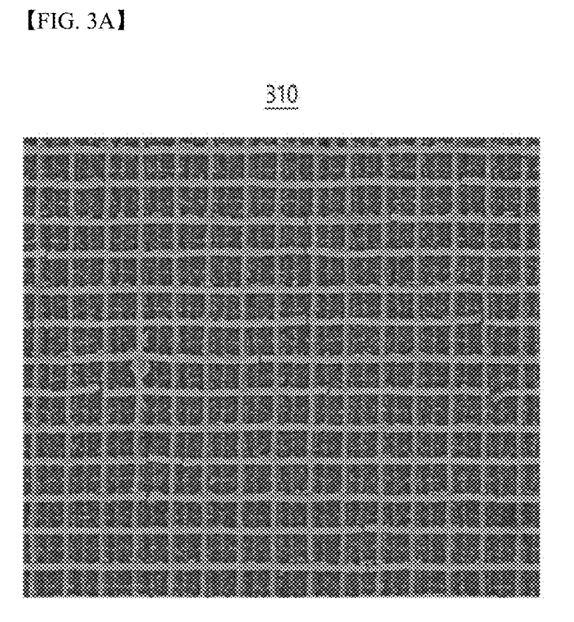
FIGS. 3A and 3B illustrate scanning electron microscope (SEM) images of plasmonic layers included in a surface-enhanced Raman scattering substrate according to an embodiment.
Figure 3B:
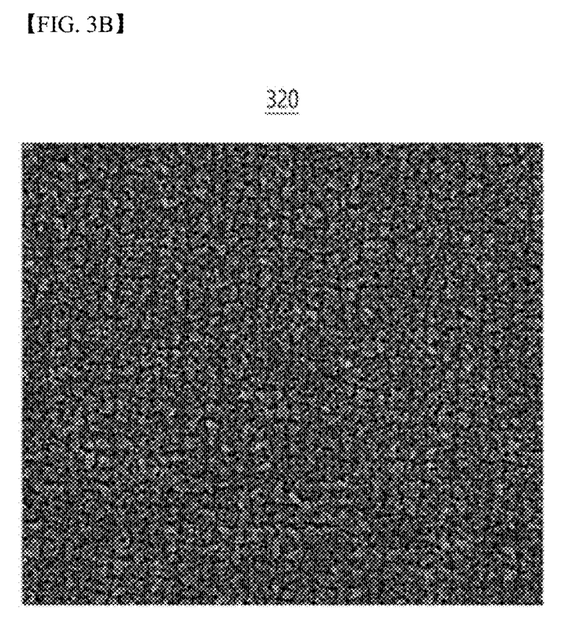

FIGS. 3A and 3B illustrate scanning electron microscope (SEM) images of plasmonic layers included in a surface-enhanced Raman scattering substrate according to an embodiment.

Referring to FIGS. 3A and 3B, the surface-enhanced Raman scattering substrate according to an embodiment may be formed by stacking a substrate, a lower plasmonic layer, an oxide layer and an upper plasmonic layer. Here, the lower plasmonic layer and the upper plasmonic layer may generate surface plasmon resonance.

Particularly, the lower plasmonic layer may be formed based on a first metal nanostructure, and the upper plasmonic layer may be formed based on a second metal nanostructure.

For example, the first and second metals may include at least one metal material of gold (Au), silver (Ag), and platinum (Pt).

In addition, the first metal nanostructure and the second metal nanostructure may be implemented in a nanowire-shaped structure shown in reference numeral 310 or a nanoparticle-shaped structure shown in reference numeral 320.

Figure 4A:
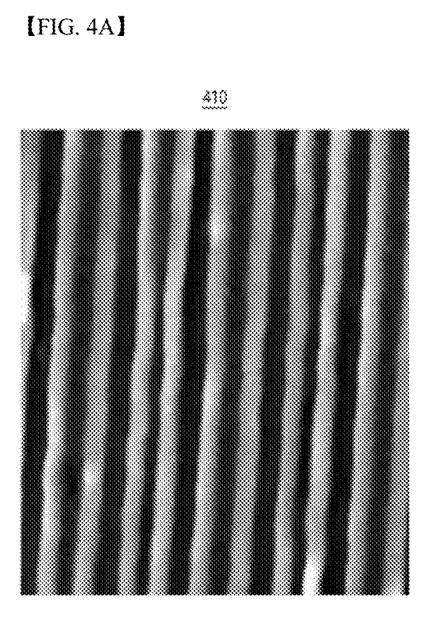
FIGS. 4A to 4B illustrate scanning electron microscope (SEM) images of oxide layers included in a surface-enhanced Raman scattering substrate according to an embodiment.
Figure 4B:
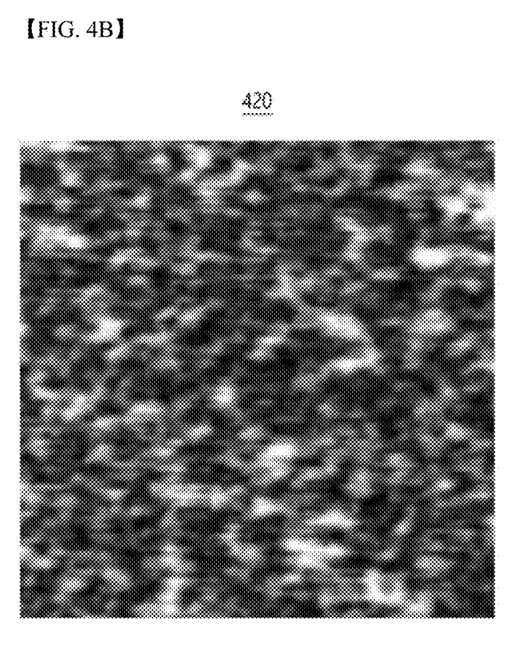

FIGS. 4A to 4B illustrate scanning electron microscope (SEM) images of oxide layers included in a surface-enhanced Raman scattering substrate according to an embodiment.

Referring to FIGS. 4A to 4B, the surface-enhanced Raman scattering substrate according to an embodiment may be formed by stacking a substrate, a lower plasmonic layer, an oxide layer and an upper plasmonic layer. Here, the oxide layer may be formed based on an oxide nanostructure and may maximize the coupling effect of surface plasmon resonance due to the lower plasmonic layer and the upper plasmonic layer.

For example, an oxide nanostructure may be implemented in a nanowire-shaped structure shown in reference numeral 410 or a nanoparticle-shaped structure shown in reference numeral 420.

Figure 5:
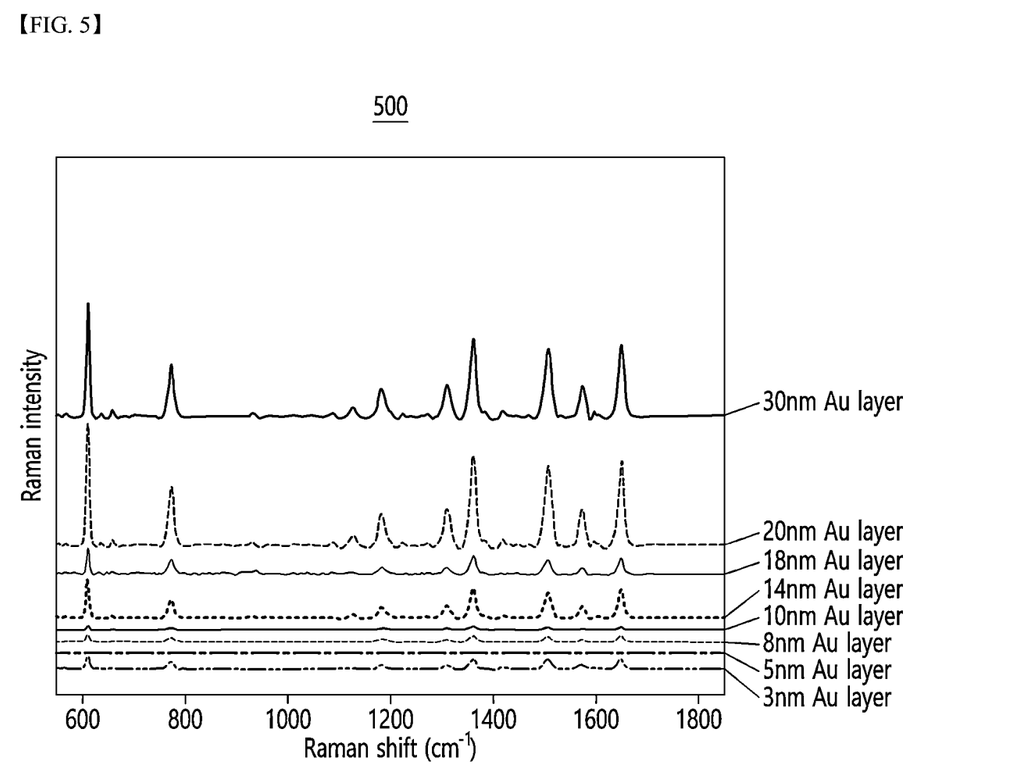
FIG. 5 illustrates sensitivity characteristics dependent upon a thickness change in a metal nanostructure of a surface-enhanced Raman scattering substrate according to an embodiment.

FIG. 5 illustrates sensitivity characteristics dependent upon a thickness change in a metal nanostructure of a surface-enhanced Raman scattering substrate according to an embodiment.

Referring to FIG. 5, reference numeral 500 illustrates Raman analysis data measured while changing the thickness of the first and second metal nanostructures.

Here, the data of reference numeral 500 was acquired by experiments conducted while changing the thickness of the first and second metal nanostructures, based on a gold (Au) material, to 3 nm to 30 nm.

As shown in reference numeral 500, it can be confirmed that the highest sensitivity characteristic is exhibited when the thickness of the first and second metal nanostructures is 20 nm.

Figure 6A:
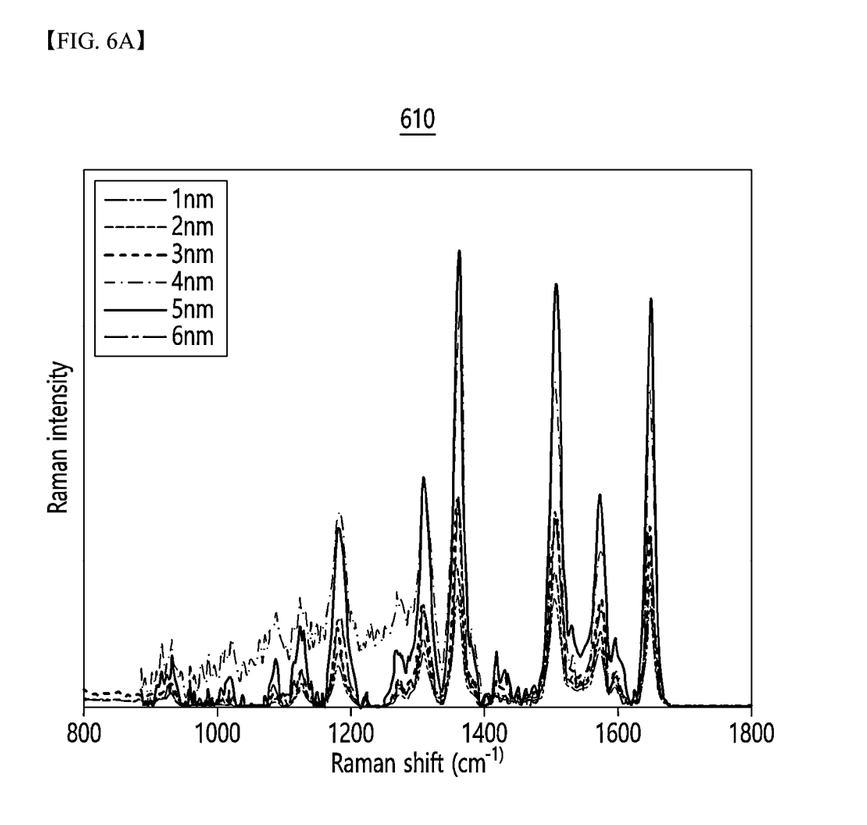
FIGS. 6A to 6B illustrate sensitivity characteristics dependent upon a thickness change in an oxide nanostructure of a surface-enhanced Raman scattering substrate according to an embodiment.
Figure 6B:
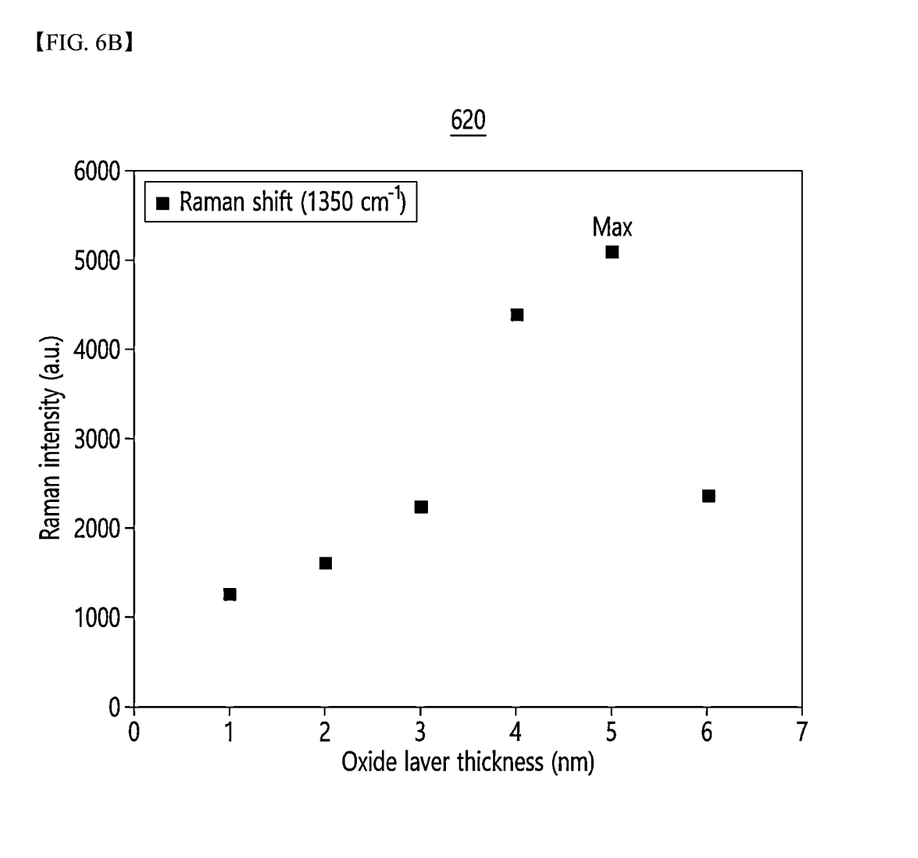

FIGS. 6A to 6B illustrate sensitivity characteristics dependent upon a thickness change in an oxide nanostructure of a surface-enhanced Raman scattering substrate according to an embodiment.

Referring to FIGS. 6A to 6B, reference numeral 610 illustrates Raman analysis data measured while changing the thickness of the oxide nanostructure, and reference numeral 620 illustrates measurement result data of a Raman intensity change dependent upon a thickness change in the oxide nanostructure when, in reference numeral 610, the Raman shift is 1350 $cm^{-1}$.

Here, the data of reference numerals 610 to 620 were acquired by experiments measured while changing the thickness of the oxide nanostructure to 1 nm to 6 nm in an environment of using R6G ($10^{-6}$ M, 10 μl) as an analyte when the thickness of the first and second metal nanostructures was formed to a thickness of 20 nm where the highest sensitivity characteristic was exhibited.

As shown in reference numerals 610 to 620, the surface-enhanced Raman scattering substrate according to an embodiment may include a space formed between the first metal nanostructure (i.e., lower plasmonic layer) and the second metal nanostructure (i.e., upper plasmonic layer); and an oxide nanostructure (i.e., oxide layer) inserted into the formed space, thereby receiving stronger surface plasmon resonance coupling effect.

In particular, it was confirmed that the surface-enhanced Raman scattering substrate exhibited the highest sensitivity when the thickness of the oxide nanostructure was formed to be 25% (i.e., 5 nm) of the thickness of the first and second metal nanostructures. In addition, it was confirmed that, when exceeded the thickness, a distance between the first metal nanostructure and the second metal nanostructure excessively increased so that the coupling effect of surface plasmon resonance was decreased.

Figure 7:
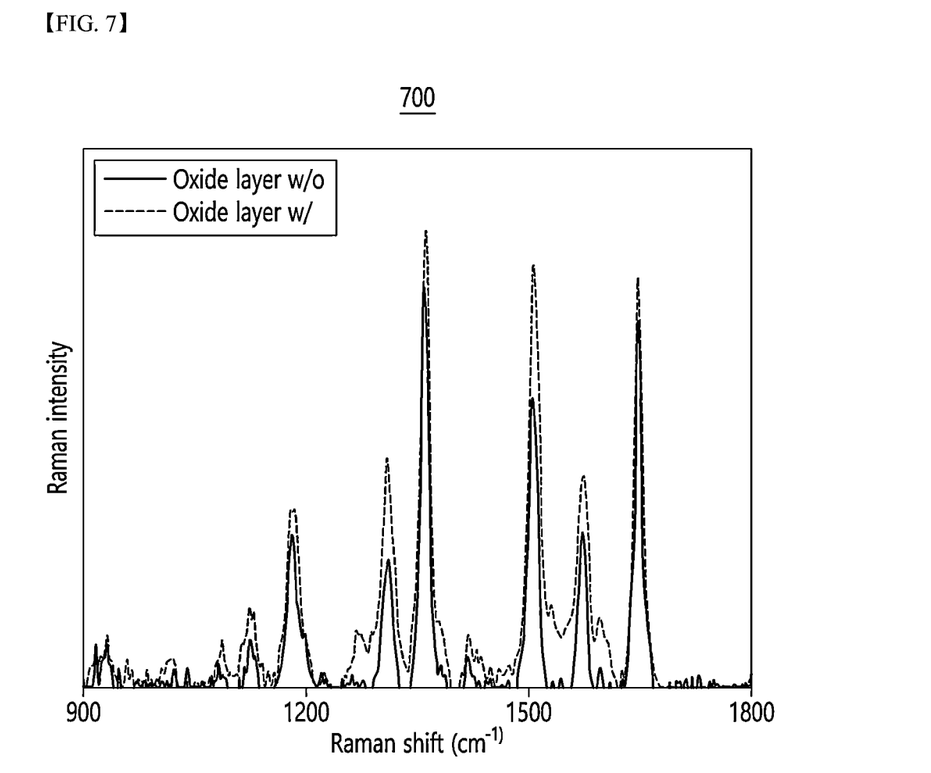
FIG. 7 illustrates sensitivity characteristics of a surface-enhanced Raman scattering substrate according to an embodiment including an oxide layer.

FIG. 7 illustrates sensitivity characteristics of a surface-enhanced Raman scattering substrate according to an embodiment including an oxide layer.

Referring to FIG. 7, reference numeral 700 illustrates Raman analysis data measured using a surface-enhanced Raman scattering substrate (Oxide layer w/o) excluding an oxide layer (i.e., an oxide nanostructure) and the surface-enhanced Raman scattering substrate according to an embodiment (Oxide layer w/) including an oxide layer.

Here, the data of reference numeral 700 were acquired by experiments in an environment of using R6G ($10^{-6}$ M) as an analyte and forming the first and second metal nanostructures to a thickness of 20 nm where the highest sensitivity characteristics are exhibited.

In addition, the data of reference numeral 700 were acquired in an environment of forming the oxide nanostructure, included in the surface-enhanced Raman scattering substrate according to an embodiment, to a thickness of 5 nm (25% of the thickness of the metal nanostructure) where the highest sensitivity is exhibited.

As shown in reference numeral 700, sensitivity characteristic comparison results of the existing surface-enhanced Raman scattering substrate (Oxide layer w/o) and the surface-enhanced Raman scattering substrate according to an embodiment (Oxide layer w/) are summarized in Table 1 below.

TABLE 1

| Wave numbers | Raman Intensity | | |
|---|---|---|---|
| ($Cm^{-1}$) | Oxide layer w/ | Oxide layer w/o | Note |
| 1182 | 1985 | 1723 | 15% increase |
| 1360 | 5112 | 4446 | 15% increase |
| 1506 | 4716 | 3265 | 44% increase |
| 1575 | 2366 | 1742 | 36% increase |
| 1648 | 4579 | 4095 | 12% increase |

That is, the surface-enhanced Raman scattering substrate according to an embodiment including the oxide layer exhibited an average sensitivity improvement effect of about 25%, compared to the existing surface-enhanced Raman scattering substrate excluding an oxide layer.

Figure 8:
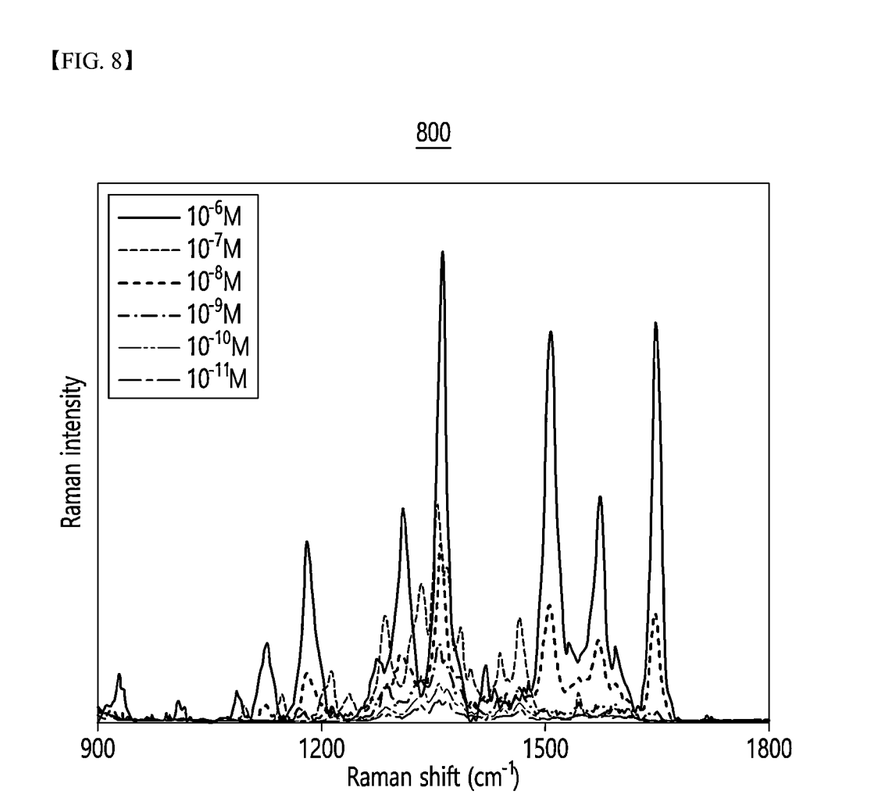
FIG. 8 illustrates the lowest measurable concentration characteristics of a surface-enhanced Raman scattering substrate according to an embodiment.

FIG. 8 illustrates the lowest measurable concentration characteristics of a surface-enhanced Raman scattering substrate according to an embodiment.

Referring to FIG. 8, reference numeral 800 illustrates Raman analysis data measured while changing the concentration of an analyte.

Here, the date of reference numeral 800 were acquired by experiments in an environment of forming the first and second metal nanostructures to a thickness of 20 nm where the highest sensitivity characteristic is exhibited, forming the oxide nanostructure to a thickness of 5 nm (25% of the thickness of the metal nanostructure) where the highest sensitivity is exhibited, using R6G ($10^{-6}$M) as an analyte, and changing the concentration of the analyte from $10^{-6}$M to $10^{-11}$M.

As shown in reference numeral 800, it was confirmed that the surface-enhanced Raman scattering substrate according to an embodiment can measure a material at the lowest concentration of about $10^{-11}$ M.

Figure 9:
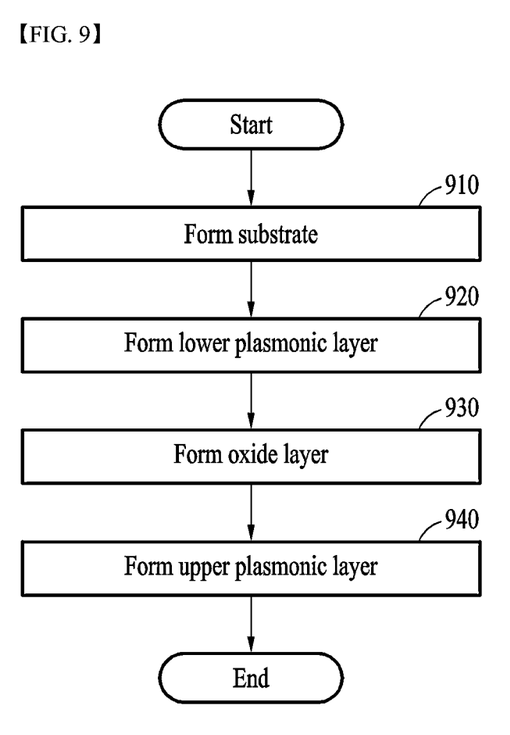
FIG. 9 illustrates a method of fabricating ae surface-enhanced Raman scattering substrate according to an embodiment.

FIG. 9 illustrates a method of fabricating ae surface-enhanced Raman scattering substrate according to an embodiment.

Referring to FIG. 9, a substrate may be formed in step 910 of the fabrication method according to an embodiment.

For example, the substrate may be made of any one of a polymer film, glass, and a ceramic material.

According to an aspect, in step 910 of the fabrication method according to an embodiment, any one material of gold (Au), silver (Ag), copper (Cu), nickel (Ni), platinum (Pt), chromium (Cr), cobalt (Co) and palladium (Pd) may be applied onto the substrate.

According to an aspect, in step 910 of the fabrication method according to an embodiment, electrodes may be respectively formed in at least two regions among a plurality of edge regions included in the substrate.

Next, in step 920 of the fabrication method according to an embodiment, a lower plasmonic layer based on the first metal nanostructure may be formed on the substrate.

According to an aspect, in step 920 of the fabrication method according to an embodiment, the first metal nanostructure may be formed by transferring and printing at least one metal material of gold (Au), silver (Ag), and platinum (Pt) on the substrate.

For example, the first metal nanostructure may be a structure based on at least one of a plurality of nanowires, a plurality of nanoparticles, a plurality of nanorods and a nanowire array wherein a plurality of nanowires vertically intersect each other.

Hereinafter, a method of fabricating a nanowire array into a metal nanostructure is described.

First, by the nanowire array fabrication method, a polymer material is deposited on a master mold to fabricate a polymer mold on which an intaglio concavo-convex pattern is formed.

According to an aspect, by the nanowire array fabrication method, a thin polymer film may be coated on the patterned master mold, and then the thin polymer film may be fabricated into a polymer mold using the thin polymer film and an adhesive film.

Particularly, by the nanowire array fabrication method, an adhesive film is uniformly onto one surface of the thin polymer film formed on the master mold, and then the adhesive film-attached thin polymer film is separated from the master mold, thereby fabricating a polymer mold. Here, the thin polymer film is applied onto the master mold using at least one process of spin coating, deep coating and spray coating, thereby forming a concavo-convex pattern.

According to an aspect, the polymer applied to the thin polymer film may have a solubility parameter of 20 MPa$^{1/2}$ to 40 MPa$^{1/2}$; and a glass transition temperature higher than room temperature. Accordingly, the polymer may be maintained in a solid state at room temperature.

Next, by the nanowire array fabrication method, a metal material may be selectively deposited on the intaglio pattern of the polymer mold to form a single-layered metal nanowire array. The formed metal nanowire array may be transferred to a target substrate.

Particularly, by the nanowire array fabrication method, the polymer mold is positioned such that the single-layered metal nanowire array is in contact with the target substrate, and then the polymer mold is only removed, so that the single-layered metal nanowire array is formed on the target substrate.

According to an aspect, by the nanowire array fabrication method, adhesive force between the adhesive film and the polymer mold may be weakened by injecting organic solvent vapor between the adhesive film and the polymer mold. Accordingly, the polymer mold may be removed such that the metal nanowire array remains on the target substrate.

According to an aspect, by the nanowire array fabrication method, the metal nanowire array-formed polymer mold and the adhesive film are brought into a polymer pad such that the metal nanowire array is in contact with the polymer pad (not shown), and the polymer mold and the adhesive film are separated from the polymer pad such that the metal nanowire array remains on the polymer pad. Next, the polymer pad, on which the metal nanowire array remains, is brought into contact with the substrate such that the metal nanowire array is contact with the substrate, and then the polymer pad is separated from the substrate to transfer the metal nanowire array.

Meanwhile, the nanowire array according to an embodiment may include a multi-stack metal nanowire array formed by repeatedly stacking a single-layered metal nanowire array that is formed by the aforementioned fabrication process.

Referring to FIG. 9 again, in step 930 of the fabrication method according to an embodiment, a lower plasmonic layer may be formed to a thickness of 20 nm.

Next, in step 930 of the fabrication method according to an embodiment, an oxide layer may be formed on the lower plasmonic layer. For example, the oxide layer may be formed based on an oxide nanostructure.

According to an aspect, in step 930 of the fabrication method according to an embodiment, an oxide nanostructure may be formed by transferring and printing silicon oxide (SiO$_2$) on the lower plasmonic layer.

For example, the oxide nanostructure may be a structure based on at least one of a plurality of nanowires, a plurality of nanoparticles, a plurality of nanorods and a nanowire array wherein a plurality of nanowires vertically intersect each other.

According to an aspect, in step 930 of the fabrication method according to an embodiment, surface plasmon resonance generated through the lower plasmonic layer and the upper plasmonic layer may be overlapped by forming an oxide layer in regions where hotspots, based on electromagnetic field generated between the lower plasmonic layer and the upper plasmonic layer, overlap.

In other words, by inserting the oxide layer into an empty space between the lower plasmonic layer and the upper plasmonic layer, an interval between the lower plasmonic layer and the upper plasmonic layer may be optimally maintained and the coupling effect of surface plasmon resonance due to the lower plasmonic layer and the upper plasmonic layer may be maximized, so that a Raman signal enhanced to a higher level may be secured.

According to an aspect, in step 930 of the fabrication method according to an embodiment, the oxide layer may be formed to a thickness of 5% to 30% of the thickness of at least one of the lower plasmonic layer and the upper plasmonic layer formed on the oxide layer. For example, the oxide layer may be formed to a thickness of 1 nm to 6 nm.

Next, in step 940 of the fabrication method according to an embodiment, the upper plasmonic layer based on the second metal nanostructure may be formed on the oxide layer.

According to an aspect, in step 940 of the fabrication method according to an embodiment, the second metal nanostructure may be formed by transferring and printing at least one metal material of gold (Au), silver (Ag), and platinum (Pt) on the oxide layer.

For example, the second metal nanostructure may be a structure based on at least one of a plurality of nanowires, a plurality of nanoparticles, a plurality of nanorods and a nanowire array wherein a plurality of nanowires vertically intersect each other.

Meanwhile, an analyte may be applied on the upper plasmonic layer. After application of the analyte, the analyte may be detected using light, scattered by the analyte, of a laser irradiated from the objective lens, i.e., Raman signals through surface-enhanced Raman scattering measurement.

According to an aspect, the oxide layer may be inserted by capillary action of the analyte applied on the upper plasmonic layer.

Particularly, an analyte should penetrate well into a space between the lower plasmonic layer and the upper plasmonic layer so as to maximize the coupling effect of surface plasmon resonance and, for this, the lower plasmonic layer, oxide layer and upper plasmonic layer of the surface-enhanced Raman scattering substrate may be implemented as a nanostructure.

In other words, due to the nanostructure-based structural feature of the surface-enhanced Raman scattering substrate, an analyte may be smoothly inserted into a space, i.e., the oxide layer, between the lower plasmonic layer and the upper plasmonic layer.

According to an aspect, the surface-enhanced Raman scattering substrate may separate an analyte based on at least one of molecular weights and polarity when a voltage having a preset magnitude is applied to the plural electrodes respectively formed in at least two regions among a plurality of edge regions.

In conclusion, the present invention can provide a high-performance surface-enhanced Raman scattering substrate having high signal enhancement effect and excellent signal uniformity and reproducibility.

In addition, the present invention can maximize the surface plasmon resonance coupling effect by inserting an oxide layer between a plurality of metal nanostructures, thereby being capable of securing a Raman signal enhanced to a higher level.

Further, the present invention can separate an analyte by the molecular weight and polarity thereof to acquire a Raman signal, thereby being capable of more easily analyzing the analyte.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

[Description of Symbols]

| | |
|---|---|
| 100: surface-enhanced Raman scattering substrate | 110: substrate |
| 120: lower plasmonic layer | 130: oxide layer |
| 140: upper plasmonic layer | |

The invention claimed is:

1. A surface-enhanced Raman scattering substrate, comprising:
    a substrate;
    a lower plasmonic layer formed on the substrate and based on a first metal nanostructure;
    an oxide layer formed on the lower plasmonic layer; and
    an upper plasmonic layer formed on the oxide layer and based on a second metal nanostructure,
    wherein the substrate comprises first to fourth electrodes formed in at first to fourth regions corresponding to four corners of the substrate and, when a voltage having a preset magnitude is applied to at least two electrodes among the first to fourth electrodes through an external voltage application means, an analyte is separated based on molecular weights and polarities.

2. The surface-enhanced Raman scattering substrate according to claim 1, wherein the oxide layer is formed in a region wherein hotspots based on electromagnetic field generated between the lower plasmonic layer and the upper plasmonic layer overlap, so that surface plasmon resonance generated through the lower plasmonic layer and the upper plasmonic layer overlaps.

3. The surface-enhanced Raman scattering substrate according to claim 1, wherein the oxide layer is formed on the lower plasmonic layer and is based on an oxide nanostructure.

4. The surface-enhanced Raman scattering substrate according to claim 3, wherein at least one of the first metal nanostructure, the second metal nanostructure and the oxide nanostructure is a structure based on at least one of a plurality of nanowires, a plurality of nanoparticles, a plurality of nanorods and a nanowire array wherein a plurality of nanowires vertically intersect each other.

5. The surface-enhanced Raman scattering substrate according to claim 1, wherein the oxide layer is formed to a thickness of 5% to 30% of a thickness of at least one of the lower plasmonic layer and the upper plasmonic layer.

6. The surface-enhanced Raman scattering substrate according to claim 5, wherein the oxide layer is formed to a thickness of 1 nm to 6 nm.

7. The surface-enhanced Raman scattering substrate according to claim 1, wherein at least one of the first metal nanostructure and the second metal nanostructure is a nanostructure based on at least one metal material of gold (Au), silver (Ag), and platinum (Pt).

8. The surface-enhanced Raman scattering substrate according to claim 1, wherein the oxide layer is inserted by capillary action of the analyte applied on the upper plasmonic layer.

9. A method of fabricating a surface-enhanced Raman scattering substrate, the method comprising:
    forming a substrate;

forming a first metal nanostructure-based lower plasmonic layer on the substrate;

forming an oxide layer on the lower plasmonic layer; and forming a second metal nanostructure-based upper plasmonic layer on the oxide layer, wherein the substrate comprises first to fourth electrodes formed in at first to fourth regions corresponding to four corners of the substrate and, when a voltage having a preset magnitude is applied to at least two electrodes among the first to fourth electrodes through an external voltage application means, an analyte is separated based on molecular weights and polarities.

* * * * *